(12) United States Patent
Harbi (10) Patent No.: US 11,319,760 B2
(45) Date of Patent: May 3, 2022

(54) SWELLABLE LOST CIRCULATION MATERIAL AND METHODS OF MANUFACTURING AND USING THE SAME

(71) Applicant: SAUDI ARABIAN OIL COMPANY, Dhahran (SA)

(72) Inventor: Atallah N. Harbi, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 110 days.

(21) Appl. No.: 16/718,319

(22) Filed: Dec. 18, 2019

(65) Prior Publication Data

US 2021/0189811 A1 Jun. 24, 2021

(51) Int. Cl.
*E21B 21/00* (2006.01)
*E21B 29/10* (2006.01)
*E21B 33/12* (2006.01)

(52) U.S. Cl.
CPC ............ *E21B 21/003* (2013.01); *E21B 29/10* (2013.01); *E21B 33/1208* (2013.01)

(58) Field of Classification Search
CPC .... E21B 21/003; E21B 29/10; E21B 33/1208; C09K 8/035; C09K 8/508
See application file for complete search history.

(56) References Cited

U.S. PATENT DOCUMENTS

| | | | |
|---|---|---|---|
| 4,664,816 A | 5/1987 | Walker | |
| 5,611,400 A | 3/1997 | James et al. | |
| 5,826,669 A | 10/1998 | Zaleski et al. | |
| 6,518,224 B2 | 2/2003 | Wood | |
| 7,642,223 B2 | 1/2010 | Santra et al. | |
| 7,891,424 B2 | 2/2011 | Creel et al. | |
| 8,043,997 B2 | 10/2011 | Whitfill et al. | |
| 8,307,916 B1 * | 11/2012 | Wald | C09K 8/508 175/72 |
| 8,404,622 B2 | 3/2013 | Ghassemzadeh | |
| 8,607,895 B2 | 12/2013 | Hoskins | |
| 8,765,645 B2 | 7/2014 | Livanec et al. | |
| 8,905,134 B2 | 12/2014 | Miller | |
| 9,284,798 B2 | 3/2016 | Jamison et al. | |
| 9,739,694 B2 | 8/2017 | Amanullah et al. | |

(Continued)

OTHER PUBLICATIONS

International Search Report and Written Opinion for International Application No. PCT/US2020/065726, report dated Apr. 14, 2021; pp. 1-14.

(Continued)

*Primary Examiner* — Crystal J. Lee
(74) *Attorney, Agent, or Firm* — Bracewell LLP; Constance G. Rhebergen; Brian H. Tompkins (57) ABSTRACT

Embodiments of the disclosure provide a method and device for controlling lost circulation in a target lost circulation zone in a borehole. A swellable lost circulation material device includes a permeable membrane and a swellable lost circulation material enclosed within the membrane. The swellable lost circulation material device in a non-swollen state is introduced to a target lost circulation zone where a fluidic component permeates into the swellable lost circulation material device through the membrane such that the fluid component is in contact with the swellable lost circulation material such that the swellable lost circulation material device transitions to a swollen state.

17 Claims, 3 Drawing Sheets

(56) References Cited

U.S. PATENT DOCUMENTS

| | | |
|---|---|---|
| 9,765,596 B2 | 9/2017 | Savari et al. |
| 9,809,736 B2 | 11/2017 | Murphy et al. |
| 10,035,941 B2 | 7/2018 | Whitfill et al. |
| 2007/0125568 A1 | 6/2007 | Kida et al. |
| 2008/0108524 A1* | 5/2008 | Willberg ................ C09K 8/035 507/225 |
| 2013/0161006 A1 | 6/2013 | Robisson et al. |
| 2017/0030169 A1 | 2/2017 | Funkhouser et al. |

OTHER PUBLICATIONS

Dph group; "HST—machines" available as of Sep. 1, 2021 at the website: https://www.teabagmachine.com/index.php/machines/hst-machines/hst-pt-6; pp. 1-6.

* cited by examiner

SWELLABLE LOST CIRCULATION MATERIAL AND METHODS OF MANUFACTURING AND USING THE SAME

BACKGROUND

Field of the Disclosure

Embodiments of the disclosure generally relate to preventing and treating lost circulation. More specifically, embodiments of the disclosure relate to a method and device for preventing and treating lost circulation during a drilling event.

Description of the Related Art

Lost circulation is one of the frequent challenges encountered during drilling operations. Lost circulation can be encountered during any stage of operations and occurs when drilling fluid (such as drilling mud) pumped into a well does not fully return to the surface. While some fluid loss is expected, excessive fluid loss is not desirable from a safety, an economical, or an environmental point of view. Lost circulation is associated with problems with well control, borehole instability, pipe sticking, unsuccessful production tests, poor hydrocarbon production after well completion, and formation damage due to plugging of pores and pore throats by mud particles. In extreme cases, lost circulation problems may force abandonment of a well.

Lost circulation can occur in various formations, such as naturally fractured formations, cavernous formations, and high permeable formations. Lost circulation can be categorized by the amount of fluid or mud lost and may be categorized as seepage loss, moderate loss, severe loss, and total loss. Seepage loss is characterized by a loss of from about 0.16 to about 1.6 cubic meter per hour ($m^3/hr$) (about 1 to about 10 barrels per hour (bbl/hr)) of drilling fluid. moderate loss is characterized by a loss of from about 1.6 to about 16 $m^3/hr$ (about 10 to about 100 bbl/hr). Severe loss is characterized by a loss greater than about 16 $m^3/hr$ (about 100 bbl/hr) but lesser than a total loss. Moderate loss, severe loss, and total loss typically requires regaining full circulation. The extent of the fluid loss and the ability to control the lost circulation with a lost circulation material (LCM) depends on the type of formation in which the lost circulation occurs. Formations with low permeability zones, that is, those with microscopic cracks and fissures, usually have seepage type lost circulation. Other formations may experience lost circulation if an improper mud weight is used while drilling. Generally speaking, when the pore size is greater than about three times the particle size, the drilling fluid may encounter a severe loss or total loss.

SUMMARY

Embodiments of the disclosure generally relate to preventing and treating lost circulation. More specifically, embodiments of the disclosure relate to a method and device for preventing and treating lost circulation during a drilling event.

Embodiments of the disclosure provide a method for controlling lost circulation in a target lost circulation zone in a borehole. The method includes the step of introducing a swellable LCM device in a non-swollen state to the target lost circulation zone. The swellable LCM device includes a membrane and a swellable LCM particle. The membrane is permeable. The swellable LCM particle includes a swellable material. The swellable LCM particle is enclosed within the membrane. The method includes the step of allowing a fluidic component to permeate into the swellable LCM device through the membrane such that the fluidic component is in contact with the swellable LCM particle and the swellable LCM device transitions to a swollen state.

In some embodiments, the swellable LCM device is essentially in a form and size of a teabag. In some embodiments, the method further includes the step of mass-producing the swellable LCM device by utilizing a teabag machine. The teabag machine is retrofitted to accommodate the swellable LCM particle and the membrane to produce the swellable LCM device.

In some embodiments, the membrane includes a fabric material. The fabric material can include silk, rayon, nylon, linen, cotton, wool, paper, wood, ceramic, glass, carbon fiber, metal fiber, cellulose, vinyl-based polymers, olefin-based polymers, ether- or ketone-based polymers, styrene-based polymers, butadiene-based polymers, imide-based polymers, sulfone-based polymers, phenyl-based polymers, fluoride-based polymers, and combinations of the same.

In some embodiments, the membrane is not water-degradable. In some embodiments, the membrane does not rupture when the swellable LCM device transitions to a swollen state.

In some embodiments, the swellable material can include polyacrylamide, polyacrylate, xanthan gum, starch, bentonite, and combinations of the same. In some embodiments, the swellable material includes a superabsorber forming a crosslinked three-dimensional molecular network upon contact with the fluidic component. The superabsorber can include acrylamide-based polymers, acrylate-based polymers, hydrogel, and combinations of the same.

In some embodiments, the swellable LCM device further includes an additive to fill voids created by the swellable LCM particle. The additive forms a mixture with the swellable LCM particle. The mixture is enclosed within the membrane. In some embodiments, the additive is not swellable. In some embodiments, the additive can include mica flakes, nut shells, sand, marble, acid soluble solids, bauxite, ceramic, glass, polymers, cured resins, wood, silica, alumina, fumed carbon, graphite, titania, silicate, kaolin, talc, zirconia, boron, ash, and combinations of the same.

In some embodiments, in the introducing step, the swellable LCM device is combined with a drilling fluid to form an altered drilling fluid. The altered drilling fluid is introduced to the target lost circulation zone via a pump. In some embodiments, the drilling fluid is a water-based drilling mud.

Embodiments of the disclosure also provide an altered drilling fluid for controlling lost circulation in a target lost circulation zone in a borehole. The altered drilling fluid includes a drilling fluid and a swellable LCM device. The swellable LCM device includes a membrane and a swellable LCM particle. The membrane is permeable. The membrane includes a fabric material. The membrane is not water-degradable. The swellable LCM particle includes a swellable material. The swellable LCM particle is enclosed within the membrane. The swellable LCM device is essentially in a form and size of a teabag. The swellable LCM device is configured to transition from a non-swollen state to a swollen state when a fluidic component permeates into the swellable LCM device through the membrane such that the fluidic component is in contact with the swellable LCM particle.

In some embodiments, fabric material can include silk, rayon, nylon, linen, cotton, wool, paper, wood, ceramic, glass, carbon fiber, metal fiber, cellulose, vinyl-based polymers, olefin-based polymers, ether- or ketone-based polymers, styrene-based polymers, butadiene-based polymers, imide-based polymers, sulfone-based polymers, phenyl-based polymers, fluoride-based polymers, and combinations of the same.

In some embodiments, the swellable material can include polyacrylamide, polyacrylate, xanthan gum, starch, bentonite, and combinations of the same. In some embodiments, the swellable material includes a superabsorber forming a crosslinked three-dimensional molecular network upon contact with the fluidic component. The superabsorber can include acrylamide-based polymers, acrylate-based polymers, hydrogel, and combinations of the same.

In some embodiments, the swellable LCM device further includes an additive to fill voids created by the swellable LCM particle. The additive forms a mixture with the swellable LCM particle. The mixture is enclosed within the membrane. The additive is not swellable. In some embodiments, the additive can include mica flakes, nut shells, sand, marble, acid soluble solids, bauxite, ceramic, glass, polymers, cured resins, wood, silica, alumina, fumed carbon, graphite, titania, silicate, kaolin, talc, zirconia, boron, ash, and combinations of the same.

In some embodiments, the drilling fluid is a water-based drilling mud.

BRIEF DESCRIPTION OF THE DRAWINGS

So that the manner in which the previously-recited features, aspects, and advantages of the embodiments of this disclosure as well as others that will become apparent are attained and can be understood in detail, a more particular description of the disclosure briefly summarized previously may be had by reference to the embodiments that are illustrated in the drawings that form a part of this specification. However, it is to be noted that the appended drawings illustrate only certain embodiments of the disclosure and are not to be considered limiting of the disclosure's scope as the disclosure may admit to other equally effective embodiments.

In the accompanying Figures, similar components or features, or both, may have a similar reference label.

DETAILED DESCRIPTION

The disclosure refers to particular features, including process or method steps. Those of skill in the art understand that the disclosure is not limited to or by the description of embodiments given in the specification. The subject matter of this disclosure is not restricted except only in the spirit of the specification and appended claims.

Those of skill in the art also understand that the terminology used for describing particular embodiments does not limit the scope or breadth of the embodiments of the disclosure. In interpreting the specification and appended claims, all terms should be interpreted in the broadest possible manner consistent with the context of each term. All technical and scientific terms used in the specification and appended claims have the same meaning as commonly understood by one of ordinary skill in the art to which this disclosure belongs unless defined otherwise.

Although the disclosure has been described with respect to certain features, it should be understood that the features and embodiments of the features can be combined with other features and embodiments of those features.

Although the disclosure has been described in detail, it should be understood that various changes, substitutions, and alternations can be made without departing from the principle and scope of the disclosure. Accordingly, the scope of the present disclosure should be determined by the following claims and their appropriate legal equivalents.

As used throughout the disclosure, the singular forms "a," "an," and "the" include plural references unless the context clearly indicates otherwise.

As used throughout the disclosure, the word "about" includes +/−5% of the cited magnitude. The word "substantially" includes +/−5% of the cited magnitude.

As used throughout the disclosure, the words "comprise," "has," "includes," and all other grammatical variations are each intended to have an open, non-limiting meaning that does not exclude additional elements, components or steps. Embodiments of the present disclosure may suitably "comprise," "consist," or "consist essentially of" the limiting features disclosed, and may be practiced in the absence of a limiting feature not disclosed. For example, it can be recognized by those skilled in the art that certain steps can be combined into a single step.

As used throughout the disclosure, the words "optional" or "optionally" means that the subsequently described event or circumstances can or may not occur. The description includes instances where the event or circumstance occurs and instances where it does not occur.

Where a range of values is provided in the specification or in the appended claims, it is understood that the interval encompasses each intervening value between the upper limit and the lower limit as well as the upper limit and the lower limit. The disclosure encompasses and bounds smaller ranges of the interval subject to any specific exclusion provided.

Where reference is made in the specification and appended claims to a method comprising two or more defined steps, the defined steps can be carried out in any order or simultaneously except where the context excludes that possibility.

As used throughout the disclosure, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that the mere use of the term "first" and "second" does not require that there be any "third" component, although that possibility is contemplated under the scope of the present disclosure.

As used throughout the disclosure, spatial terms described the relative position of an object or a group of objects relative to another object or group of objects. The spatial relationships apply along vertical and horizontal axes. Orientation and relational words are for descriptive convenience and are not limiting unless otherwise indicated.

As a wellbore is drilled, a drilling fluid is continuously pumped into the wellbore to clear and clean the wellbore and the filings (the cuttings resulting from drilling). The drilling fluid is pumped from a mud pit into the wellbore and returns again to the surface. A lost circulation zone is encountered when the flow rate of the drilling fluid that returns to the surface is less than the flow rate of the drilling fluid pumped into the wellbore, and it is this reduction or absence of returning drilling fluid that is referred to as lost circulation.

Embodiments of the disclosure provide a swellable LCM device that can mitigate or prevent lost circulation in a well, as well as provide seepage control and minimize or prevent fluid loss. In some embodiments, the swellable LCM device is directly placed in the target lost circulation zone as a preventative approach for lost circulation control. In some embodiments, the swellable LCM device can be added to a drilling fluid (for example, a drilling mud). In some embodiments, the swellable LCM device can be mixed with a carrier fluid to form a substantially homogeneous mixture. Optionally, the swellable LCM device can be mixed with mud or water and a viscosifier to suspend and transfer the LCMs. In some embodiments, the swellable LCM device can be added as a component of a loss control slurry (LCS). In some embodiments, the swellable LCM device can be added to cement to prevent losses occurring while cementing. In some embodiments, the swellable LCM device can be combined with other LCMs to form an LCM blend for different loss control applications. Additionally, the LCM may also be added to a drilling fluid system to increase the fracture gradient due to an increase in load bearing capacity or hoop stress around the wellbore.

Figure 1A:
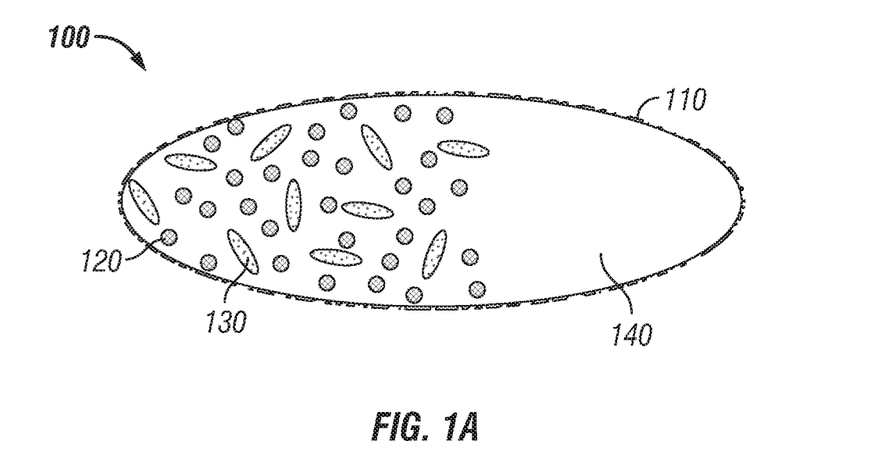
FIG. 1A is a perspective view of a swellable LCM device, according to an embodiment of the disclosure.
Figure 1B:
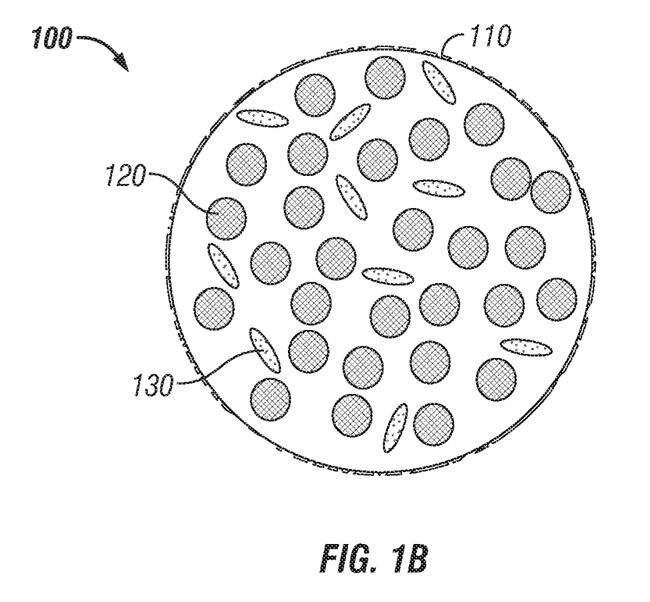
FIG. 1B is a perspective view of the swellable LCM device, according to an embodiment of the disclosure.

FIGS. 1A and B show perspective views of the swellable LCM device 100, according to an embodiment of the disclosure. The swellable LCM device 100 includes a membrane 110 and a swellable LCM particle 120. Optionally, the swellable LCM device 100 can include an additive 130 or mixture of additives 130. As shown in FIG. 1A, the swellable LCM device 100 is in a non-swollen state. In the non-swollen state, the swellable LCM device 100 includes a vacancy 140 to accommodate the volume increase upon the swellable LCM particle 120 transitioning to a swollen state. In some embodiments, in the non-swollen state, the swellable LCM device 100 is substantially in the absence of the vacancy 140 if the membrane 110 includes an elastic material (such as rubber) that can expand upon the swellable LCM particle 120 swelling. As shown in FIG. 1B, the swellable LCM device 100 is in the swollen state. The swellable LCM device 100 in the swollen state is of sufficient size to plug the target lost circulation zone so that fluids cannot undesirably migrate through such zone. In some embodiments, the swellable LCM particle 120 can swell up to at least about 200%, alternately at least about 400%, or alternately at least about 600% of its non-swollen volume to plug the target lost circulation zone.

The membrane 110 is capable of retaining the swellable LCM particle 120 upon swelling. The membrane 110 is capable of maintaining the structural integrity of the swellable LCM particle 120 upon swelling. Direct pumping of the swellable LCM particle 120 (without the membrane 110) to the target lost circulation zone may lead to certain loss, deformation, and poor performance of the swellable LCM particle 120. Therefore, instead of directly pumping the swellable LCM particle 120 to the target lost circulation zone, the swellable LCM particle 120 is retained in the sealed membrane 110 (that is, the swellable LCM particle 120 is not directly exposed to a fluidic component), where the inflow of the water-based (including oil-in-water emulsions) fluidic component or the oil-based fluidic component (including water-in-oil emulsions) from the wellbore into the swellable LCM device 100 does not result in a rupture of the membrane 110. The swellable LCM particle 120 makes contact with the fluidic component when such fluidic component permeates into the swellable LCM device 100 via the membrane 110. The membrane 110 can include pores which are small enough to retain the swellable LCM particle 120 but large enough to pass water or oil.

The membrane 110 can be formed from any material capable for use in a hydrocarbon well operation. The membrane 110 can be flexible. The membrane 110 can be elastic. The membrane 110 is permeable such that a fluidic component, either water-based or oil-based, can permeate into the interior of the swellable LCM device 100 and make contact with the swellable LCM particle 120. Non-limiting examples of materials used for the membrane 110 can include any fabric material such as silk, rayon, nylon, linen, cotton, wool, paper (including filter paper), wood, ceramic, glass, carbon fiber, metal fiber. Non-limiting examples of materials used for the membrane 110 can include any polymeric material such as cellulose, vinyl-based polymers, olefin-based polymers, ether- or ketone-based polymers, styrene-based polymers, butadiene-based polymers, imide-based polymers, sulfone-based polymers, phenyl-based polymers, fluoride-based polymers, copolymers of the same, and derivatives of the same. One skilled in the art would recognize that any fabric material that is capable of being manufactured into a permeable membrane can be used as a material for the membrane 110. In some embodiments, the membrane 110 includes an elastic material to reduce the size of the swellable LCM device 100 in its non-swollen state. The membrane 110 can include an exterior surface having an enhanced degree of friction such that the swellable LCM device 100 can accumulate against one another, or accumulate to the target lost circulation zone. In some embodiments, the membrane 110 is double layered. The membrane 110 is not water-soluble. The membrane 110 is not water degradable. The membrane 110 can have any thickness suitable for containing the swellable LCM particle 120 and being received in the wellbore. In some embodiments, the membrane 110 can have a thickness suitable to provide sufficient structural integrity for containing the swellable LCM particle 120 during transport into the well and upon swelling of the swellable LCM particle 120.

The swellable LCM particle 120 includes a swellable material. The swellable material can be capable of swelling upon contact with the fluidic component permeating into the swellable LCM device 100. Non-limiting examples of the swellable material can include polymers such as polyacrylamide, and polyacrylate. Non-limiting examples of the swellable material can include polysaccharides such as xanthan gum. Non-limiting examples of the swellable material can include starch and bentonite. Non-limiting examples of the swellable material can include superabsorbers. As used throughout the disclosure, the term "superabsorber" refers to a swellable, crosslinked polymer that, by forming a gel, is capable of absorbing and storing many times its own weight of water-based liquids. Superabsorbers retain the water-based liquid that they absorb and typically do not release the absorbed liquids, even under pressurized conditions. Superabsorbers also increase in volume upon absorption of the water-based liquid they absorb. Non-limiting examples of superabsorbers can include acrylamide-based polymers, acrylate-based polymers, and hydrogel, all of which are capable of forming crosslinked three-dimensional molecular networks. The swellable material, in the non-swollen state, can have a dimension less than about 30 millimeters (mm) in diameter, alternately less than about 15 mm in diameter, or less than about 5 mm in diameter. The swellable material, in the swollen state, can have a volume up to about 30 times the non-swollen volume, alternately up to about 10 times the non-swollen volume, or alternately up to about 5 times the non-swollen volume. The swellable material can exist in granular form or powder form. In some embodiments, the swellable LCM particle 120 includes a swellable material that is time-controlled such that premature swelling is prevented. The swelling event is delayed until the swellable material reaches the target lost circulation zone. For example, the swelling event can be delayed by adjusting the pH or the temperature of the drilling fluid in cases where the swelling of swellable material is pH-dependent or temperature dependent, respectively. In addition, the swelling event can be delayed by reducing the permeability of the membrane or mud additives. In this manner, the swellable LCM device 100 can be added to a drilling fluid or a carrier fluid then pumped into the wellbore.

Optionally, the swellable LCM device 100 can include an additive 130 in addition to the swellable LCM particle 120 to form a mixture. The additive 130 can be selected to customize the certain properties of the mixture. The additive 130 can synergistically interact with the swellable LCM particle 120 such that the sealing capacity of the swellable LCM device 100 is enhanced at the target lost circulation zone. The additive 130 can fill any voids created by the swellable LCM particle 120. The additive 130 is not swellable. The additive 130 can include any material suitable for use in a hydrocarbon operation. Non-limiting examples of the additive 130 can include mica flakes, nut shells, sand, marble, acid soluble solids, bauxite, ceramic, glass, polymers, cured resins, wood, silica, alumina, fumed carbon, graphite, titania, silicate, kaolin, talc, zirconia, boron, ash, and combinations of the same. Non-limiting examples of the additive 130 can include metal particles to control the overall density of the swellable LCM device 100. Depending on the size range of the swellable LCM particle 120, the additive 130 can seal gaps of different sizes when used to mitigate or prevent lost circulation in a well. In some embodiments, the additive 130 can be generally granular shaped with various size ranges to enable the swellable LCM device 100 to enter porous and permeable paths, cracks, and fractures in a formation causing mud losses in order to produce an effective seal, barrier, or other preventative to further mud losses. In other embodiments, the additive 130 can be in other shapes such as sticks, flakes, winded hair-like shapes, spheres (filled or hollow), hollow circular or polygonal cylinders, cones, or the like. Non-limiting examples of the additive 130 can include sealing agents such as swelling clays, silicate salts with gelling agents, divalent metal salts, thermosetting resin compositions, and latex emulsions. Non-limiting examples of the additive 130 can include weighting agents to increase the density of the mixture contained in the sealed membrane 110 such as barite, silica, zeolites, lead, sand, fibers, and polymers. Non-limiting examples of the additive 130 can include weighting agents to decrease the density of the mixture contained in the sealed membrane 110 such as wood, plastic, or other low density materials. In some embodiments, the additive 130 can be used to enhance the compressive strength of the overall swellable LCM device 100 to withstand subsurface stresses.

The swellable LCM device 100 including the membrane 110 and the swellable LCM particle 120 allows a concentrated mass of the swellable LCM particle 120 to be placed in a location of interest, for example the target loss circulation zone. The swellable LCM device 100 can be used for other purposes not limited to: positioning the swellable LCM device 100 in the wellbore to isolate the subterranean formation from a portion of the wellbore, supporting a conduit in the wellbore, plugging a void or crack in the conduit, plugging a void or crack in a cement sheath disposed in an annulus, plugging an opening between the cement sheath and the conduit, and sealing an annulus between the wellbore and an expandable pipe or pipe string.

The shape and size (for example, diameter and length) of the swellable LCM device 100 can be selected based on the dimension of the target lost circulation zone. Such shape and size does not create pumping issues when being introduced into the wellbore with an accompanying fluid. The swellable LCM device 100 can be in various shapes such as star, stick, rectangle, triangle, sphere, cylinder, or the like. One skilled in the art would recognize that the shape and size of the swellable LCM device 100 can be optimized depending on the type of the target lost circulation zone. For example, a subsurface cavern-like lost circulation zone can be confronted during a drilling event, which may initially require relatively larger swellable LCM devices 100 having an elongated shape and later require relatively smaller swellable LCM devices 100 having a spherical shape to completely seal the lost circulation zone.

In some embodiments, the swellable LCM device 100 is essentially in the form and size of a teabag. Such swellable LCM device 100 can be used along with an open-ended rill pipe to treat severe or total losses. The swellable LCM device 100 can be mass-produced using a teabag machine. For example, the teabag machine (or a manufacturing apparatus similar to that) can be retrofitted to accommodate the swellable material (and the optional additives 130) used for the swellable LCM particle 120 in lieu of tea. The teabag machine can be retrofitted to accommodate the material used for the membrane 110 in lieu of the fabric material used for the teabag.

Figure 2:
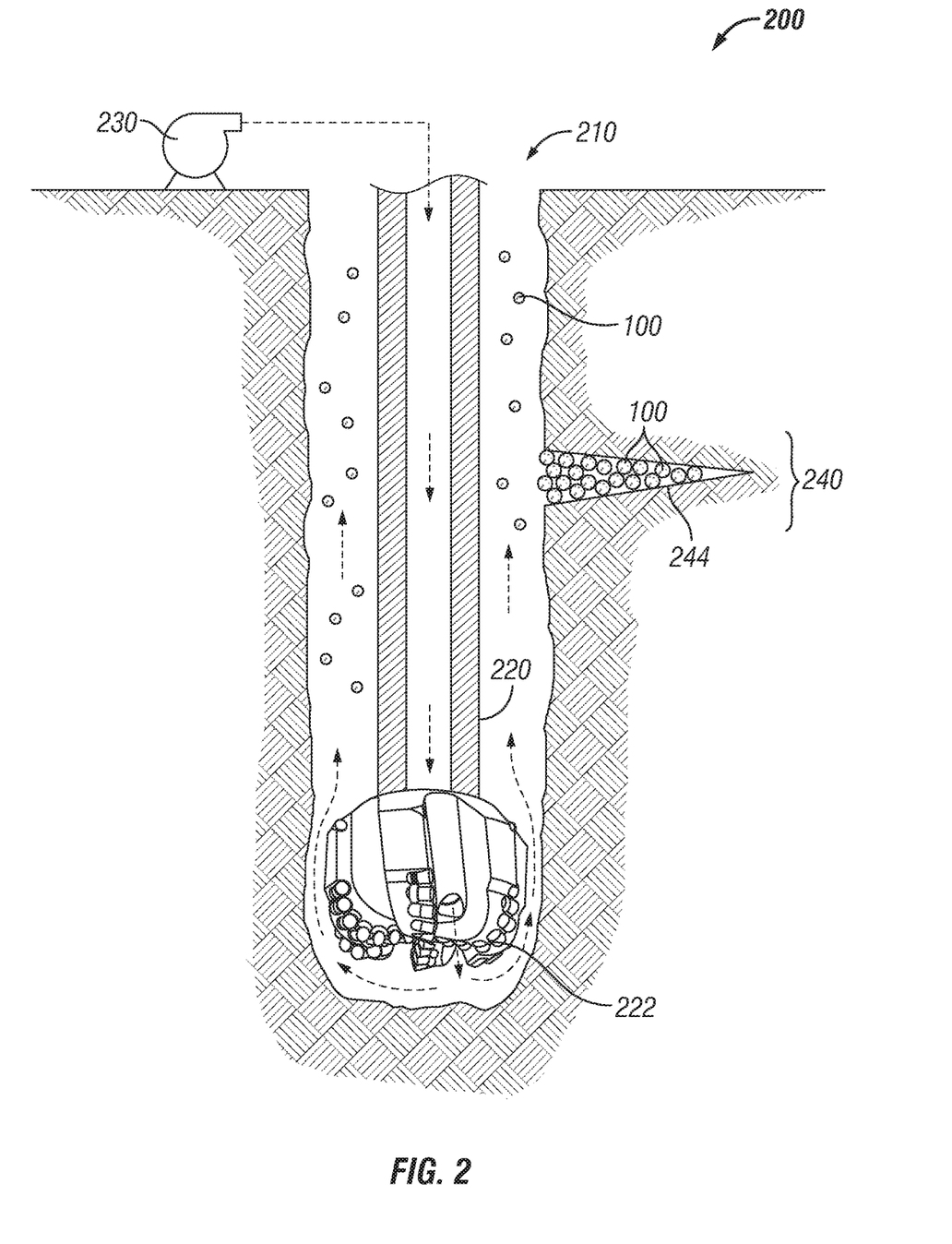
FIG. 2 is a sectional view of introducing the swellable LCM device into a borehole of a subterranean formation, according to an embodiment of the disclosure.

FIG. 2 shows a sectional view of introducing the swellable LCM device 100 into a borehole 210 of a subterranean formation 200, according to an embodiment of the disclosure. The borehole 210 extends downwards from a surface of the earth, which can be a ground level surface or a subsea surface. A drill string 220 extends into the borehole 210. The borehole 210 can be an uncased opening. In other embodiments, the borehole 210 can be part of an outer tubular member, such as a casing. The drill string 220 includes downhole tools and equipment that are secured in line with joints of the drill string 220. The drill string 220 can have a bottom hole assembly including a drill bit 222. The drill bit 222 rotates to create the borehole 210. In some embodiments, the drill bit 222 can include nozzles to allow the swellable LCM device 100 to exit the drill string 220 and enter the borehole 210. In some embodiments, the drill string 220 can include a circulation PBL® sub (DSIFZE, Dubai, UAE) to allow relatively larger particles (such as the swellable LCM device 100) to be pumped while preventing sensitive tools such as measurement while drilling (MWD) tools and small bit nozzles from failure.

The swellable LCM device 100 can be mixed with or added to a drilling fluid, a base fluid, or a carrier fluid. The swellable LCM device 100 can be added to a base fluid and stored prior to use, for example, as a mixture, dispersion or suspension. The swellable LCM device 100 can be dispersed or suspended in a suitable carrier fluid prior to being added to a drilling fluid or a base fluid. The swellable LCM device 100 can be added to mixing tanks prior to circulation, or can be added while drilling ahead. The swellable LCM device 100 can be added as a single addition prior to drilling, or can be added continuously or intermittently throughout the operation. The swellable LCM device 100 can be added in increments while drilling ahead or in heavy sweeps and pill additions. The swellable LCM device 100 can be continually mixed into the drilling fluid. The rate and route of addition can be adjusted throughout the drilling procedure to account for changes anticipated or encountered throughout the procedure. For example, an initial volume of the swellable LCM device 100 is added to the drilling fluid or base fluid prior to drilling and additional volumes can be added throughout the drilling operation, as needed. The concentration of the swellable LCM device 100 in the drilling fluid can be adjusted throughout the procedure to account for sudden changes in lost circulation that can be experienced. In some embodiments, the swellable LCM device 100 can be mixed directly into the active circulating drilling fluid at a rate of about 0.01 to about 100 kilograms per minute while drilling ahead. Alternatively, the swellable LCM device 100 can be mixed into a holding tank or premix tank containing the drilling fluid or base fluid, for example, in a concentration range from about 0.01 to about 500 kilograms per cubic meter.

The drilling fluid or base fluid can include any drilling fluid that can be used in a hydrocarbon well operation for controlling formation pressure, removing drilling cuttings, and cooling the drill bit 222. Non-limiting examples of the drilling fluid include oil-based fluids, water-based fluids, water-miscible fluids, water-in-oil emulsions, and oil-in-water emulsions. Non-limiting example oil-based fluids include alkanes, olefins, aromatic organic compounds, cyclic alkanes, paraffins, diesel fluids, mineral oils, and desulfurized hydrogenated kerosenes. Non-limiting example water-based fluids include fresh water, saltwater (that is, water containing one or more dissolved salts), brine (that is, saturated salt water), and seawater. Non-limiting example water-miscible fluids include alcohols (for example, methanol, ethanol, n-propanol, isopropanol, n-butanol, sec-butanol, isobutanol, and t-butanol), glycerins, glycols (for example, polyglycols, propylene glycol, and ethylene glycol), polyglycol amines, polyols, any derivative of the same, any in combination with salts (for example, sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), and any in combination with an aqueous-based fluid. Non-limiting examples of water-in-oil emulsions, known as invert emulsions, can have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the fluid, where the amount can range from any lower limit to any upper limit.

The swellable LCM device 100 is introduced into the borehole 210 along with the drilling fluid via a pump 230. As the swellable LCM device 100 approaches the target lost circulation zone 240 downhole, the water-based or oil-based fluid surrounding the swellable LCM device 100 permeates into the membrane 110 and makes contact with the swellable LCM particle 120 such that swelling occurs. The swellable LCM device 100 accumulates in the macrochannel 244 of the target lost circulation zone 240. Depending on the delay of the swellable material, the swellable LCM device 100 can accumulate in the macrochannel 244 either in the non-swollen state or in the swollen state, or in an intermediately swollen state. In some embodiments, a hydraulic pressure differential can be created by the pumping of the drilling fluid and the loss occurring at a lost circulation zone. The hydraulic pressure differential can physically drive or drag the swellable LCM device 100 to the macrochannel 244. In addition, the enhanced friction of the membrane 110 allows better adherence to the macrochannel 244 or against other swellable LCM devices 100, or both to maintain the accumulation.

In some embodiments, the swellable LCM device 100 is configured to at least partially accumulate in the macrochannel 244 of the target lost circulation zone 240 which is responsible for a severe loss or total loss. While the accumulation of the swellable LCM device 100 to the macrochannel 244 prevents the undesired fluids from entering or exiting the macrochannel 244 of the target lost circulation zone 240 responsible for severe loss or total loss, other conventional means of controlling loss circulation can be incorporated to control other lost circulation zones responsible for seepage or moderate losses. Other convention means can include spotting of LCM pills, plugging pores, and creation of a mud cake.

Figure 3:
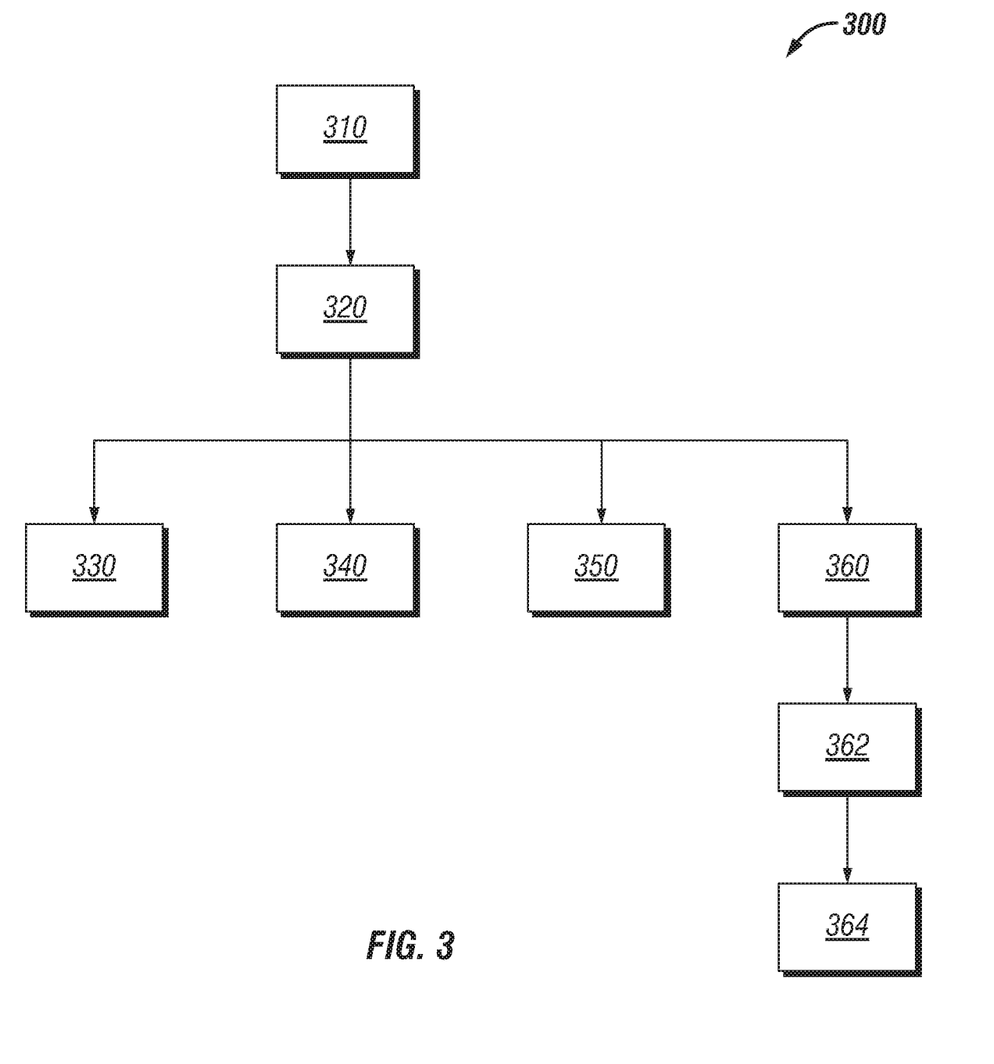
FIG. 3 is a schematic diagram of a process for manufacturing and using the swellable LCM device, according to an embodiment of the disclosure.

FIG. 3 shows a schematic diagram of a process 300 for manufacturing and using the swellable LCM device, according to an embodiment of the disclosure. In block 310, certain parameters of the swellable LCM device are determined pursuant to the specific drilling application. Parameters include the type of material used for the swellable LCM particle (and the optional additive) or the membrane, properties of the material used for the swellable LCM particle (and the optional additive) or the membrane, size and quantity of the swellable LCM particle (and the optional additive), and size, shapes, and quantity of the swellable LCM device. In block 320, the swellable LCM device is manufactured. The swellable LCM device can be mass-produced by using machinery designed to manufacture teabag-like products. In an embodiment, the swellable LCM particle (and the optional additive) is provided in bulk quantity (in granular or powder form) and are put in a container that can have an inverted cone configuration. The container can have rotating blades to thoroughly mix the swellable LCM particle (and the optional additive). There can be multiple containers, each including separate types of the swellable LCM particle (and the optional additive) to be dispensed at a predetermined volume ratio. At the bottom of the container includes a measurement tool to dispense a predetermined volume of the swellable LCM particle (and the optional additive). The membrane material (typically prepared in a rolled form having a fixed width) is unrolled and cut into a predetermined length. The cut membrane material is sewed, thermally bonded, or otherwise prepared to have a pocket-like configuration. The swellable LCM particle (and the optional additive) is dispensed into the membrane having the pocket-like configuration. The open end of the membrane having the pocket-like configuration is sealed by sewing, thermal bonding, or other like method. In this manner, mass-production of the swellable LCM device can be achieved.

In block 330, the swellable LCM device can be directly placed to the target lost circulation zone. The swellable LCM device makes contact with the water-based or oil-based fluidic components such that swelling occurs to block porous and permeable paths, cracks, and fractures in the target lost circulation zone in the wellbore. In some embodiments, the reduced rate of lost circulation may be about 80%. In some embodiments, the reduced rate of lost circulation may be negligible.

In block 340, the swellable LCM device can be added directly to a drilling fluid, such as a drilling mud, to create an altered drilling fluid including the swellable LCM device. For example, in some embodiments, the swellable LCM device can be added to (for example, blended with) an oil-based drilling mud or a water-based drilling mud. In some embodiments, the swellable LCM device can be added at the mud pit of a mud system. After addition of the swellable LCM device to the drilling fluid, the altered drilling fluid can be circulated at a pump rate effective to position the drilling fluid into contact with the target lost circulation zone in the wellbore, such that the swellable LCM device alters the target lost circulation zone (for example, by entering and blocking porous and permeable paths, cracks, and fractures in a formation in the target lost circulation zone). In some embodiments, the reduced rate of lost circulation may be about 80%. In some embodiments, the reduced rate of lost circulation may be negligible.

In block 350, the swellable LCM device and one or more additional conventionally used LCMs can be added to a drilling fluid, such as a drilling mud, to create an altered drilling fluid having the conventionally used LCMs. Such conventionally used LCMs can be mixed with the swellable LCM device to provide an increased degree of sealing of the target lost circulation zone, which can be determined by experimentation. For example, in some embodiments, the swellable LCM device and one or more additional conventionally used LCMs can be added to an oil-based drilling mud or a water-based drilling mud. In some embodiments, the swellable LCM device can be manufactured to block fractures of less than 1 mm. In some embodiments, the swellable LCM device can be manufactured to block fractures of about 4 mm. One skilled in the art would recognize that the swellable LCM device can be manufactured to block fractures of any size to prevent any type of lost circulation.

In block 360, the swellable LCM device can be further processed. In some embodiments, the swellable LCM device can be mixed with a carrier fluid and an optional viscosifier. In block 362, a substantially homogeneous mixture of the swellable LCM device and the carrier fluid can be formed. For example, a specific carrier fluid, viscosifier, or combination of the same can be selected to form a substantially homogenous mixture having the swellable LCM device. In some embodiments, the carrier fluid may be a water-based or an oil-based fluid. In some embodiments, the carrier fluid can be fresh water, sea water, salt water, diesel oil, mineral oil, or synthetic oil. In some embodiments, the viscosifier can be a clay or a polymer. In some embodiments, the viscosifier can be bentonite clay, XC polymer, starch, or psyllium husk. In block 364, the substantially homogenous mixture can be added to a drilling fluid, such as a drilling mud.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used described in the disclosure are for organizational purposes only and are not meant to be used to limit the scope of the description.

What is claimed is:

1. A method for controlling lost circulation in a target lost circulation zone in a borehole, the method comprising the steps of:
    introducing a swellable lost circulation material (LCM) device in a non-swollen state to the target lost circulation zone, the swellable LCM device comprising:
        a membrane, the membrane being permeable;
        a plurality of swellable LCM particles, each of the swellable LCM particles comprising a swellable material,
        wherein the plurality of swellable LCM particles are enclosed within the membrane; and
        an additive, wherein the additive forms a mixture with the plurality of swellable LCM particles, wherein the mixture is enclosed within the membrane, wherein the additive is not swellable;
    allowing a fluidic component to permeate into the swellable LCM device through the membrane such that the fluidic component is in contact with the plurality of swellable LCM particles and the swellable LCM device transitions to a swollen state, wherein the plurality of swellable LCM particles define a void enclosed in the membrane and the additive fills the void when the swellable LCM device transitions to the swollen state.

2. The method of claim 1, further comprising the step of:
    mass-producing the swellable LCM device by utilizing a teabag machine, wherein the teabag machine is retrofitted to accommodate the swellable LCM particle and the membrane to produce the swellable LCM device.

3. The method of claim 1, wherein the membrane comprises a fabric material.

4. The method of claim 3, wherein the fabric material is selected from the group consisting of: silk, rayon, nylon, linen, cotton, wool, paper, wood, ceramic, glass, carbon fiber, metal fiber, cellulose, vinyl-based polymers, olefin-based polymers, ether- or ketone-based polymers, styrene-based polymers, butadiene-based polymers, imide-based polymers, sulfone-based polymers, phenyl-based polymers, fluoride-based polymers, and combinations of the same.

5. The method of claim 1, wherein the membrane is not water-degradable.

6. The method of claim 1, wherein the membrane does not rupture when the swellable LCM device transitions to a swollen state.

7. The method of claim 1, wherein the swellable material is selected from the group consisting of: polyacrylamide, polyacrylate, xanthan gum, starch, bentonite, and combinations of the same.

8. The method of claim 1, wherein the swellable material comprises a superabsorber forming a crosslinked three-dimensional molecular network upon contact with the fluidic component, wherein the superabsorber is selected from the group consisting of: acrylamide-based polymers, acrylate-based polymers, hydrogel, and combinations of the same.

9. The method of claim 1, wherein the additive is selected from the group consisting of: mica flakes, nut shells, sand, marble, acid soluble solids, bauxite, ceramic, glass, polymers, cured resins, wood, silica, alumina, fumed carbon, graphite, titania, silicate, kaolin, talc, zirconia, boron, ash, and combinations of the same.

10. The method of claim 1, in the introducing step, the swellable LCM device is combined with a drilling fluid to form an altered drilling fluid, wherein the altered drilling fluid is introduced to the target lost circulation zone via a pump.

11. The method of claim 10, wherein the drilling fluid is a water-based drilling mud.

12. An altered drilling fluid for controlling lost circulation in a target lost circulation zone in a borehole, the altered drilling fluid comprising:
   a drilling fluid; and
   a swellable lost circulation material (LCM) device, the swellable LCM device comprising:
      a membrane, the membrane being permeable, the membrane comprising a fabric material, the membrane not being water-degradable;
      a plurality of swellable LCM particles, each of the swellable LCM particles comprising a swellable material,
      wherein the plurality of swellable LCM particles are enclosed within the membrane; and
      an additive, wherein the additive forms a mixture with the plurality of swellable LCM particles, wherein the mixture is enclosed within the membrane, wherein the additive is not swellable;
   wherein the swellable LCM device is configured to transition from a non-swollen state to a swollen state when a fluidic component permeates into the swellable LCM device through the membrane such that the fluidic component is in contact with the plurality of swellable LCM particles, wherein the plurality of swellable LCM particles define a void enclosed in the membrane and the additive fills the void when the swellable LCM device transitions to the swollen state.

13. The altered drilling fluid of claim 12, wherein the fabric material is selected from the group consisting of: silk, rayon, nylon, linen, cotton, wool, paper, wood, ceramic, glass, carbon fiber, metal fiber, cellulose, vinyl-based polymers, olefin-based polymers, ether- or ketone-based polymers, styrene-based polymers, butadiene-based polymers, imide-based polymers, sulfone-based polymers, phenyl-based polymers, fluoride-based polymers, and combinations of the same.

14. The altered drilling fluid of claim 12, wherein the swellable material is selected from the group consisting of: polyacrylamide, polyacrylate, xanthan gum, starch, bentonite, and combinations of the same.

15. The altered drilling fluid of claim 12, wherein the swellable material comprises a superabsorber forming a crosslinked three-dimensional molecular network upon contact with the fluidic component, wherein the superabsorber is selected from the group consisting of: acrylamide-based polymers, acrylate-based polymers, hydrogel, and combinations of the same.

16. The altered drilling fluid of claim 12, wherein the additive is selected from the group consisting of: mica flakes, nut shells, sand, marble, acid soluble solids, bauxite, ceramic, glass, polymers, cured resins, wood, silica, alumina, fumed carbon, graphite, titania, silicate, kaolin, talc, zirconia, boron, ash, and combinations of the same.

17. The altered drilling fluid of claim 12, wherein the drilling fluid is a water-based drilling mud.

* * * * *